July 1, 1941.  R. I. MARKEY  2,247,393
EXHAUST COLLECTOR
Filed Oct. 10, 1939   2 Sheets-Sheet 1
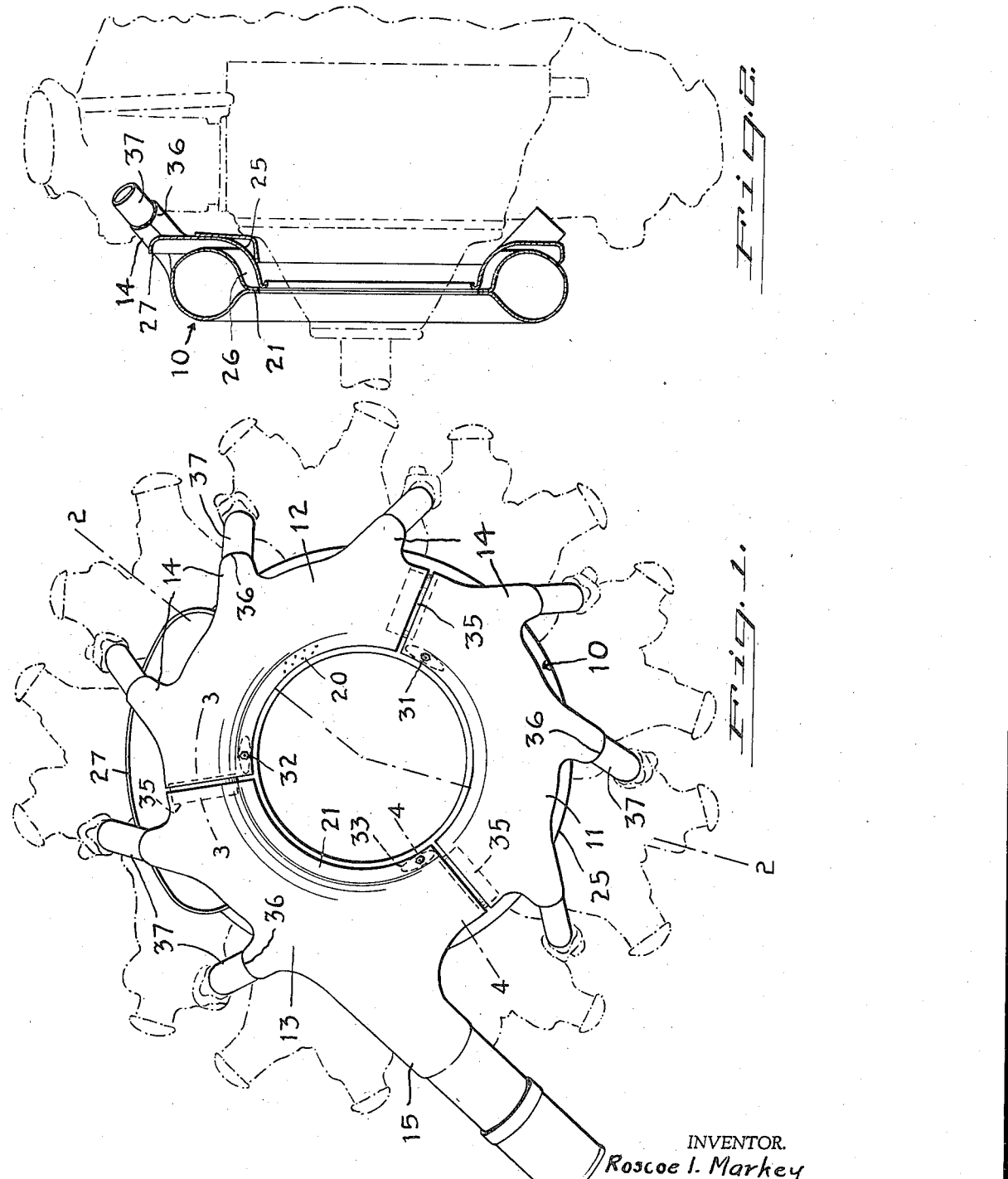
INVENTOR.
Roscoe I. Markey
BY
ATTORNEY.

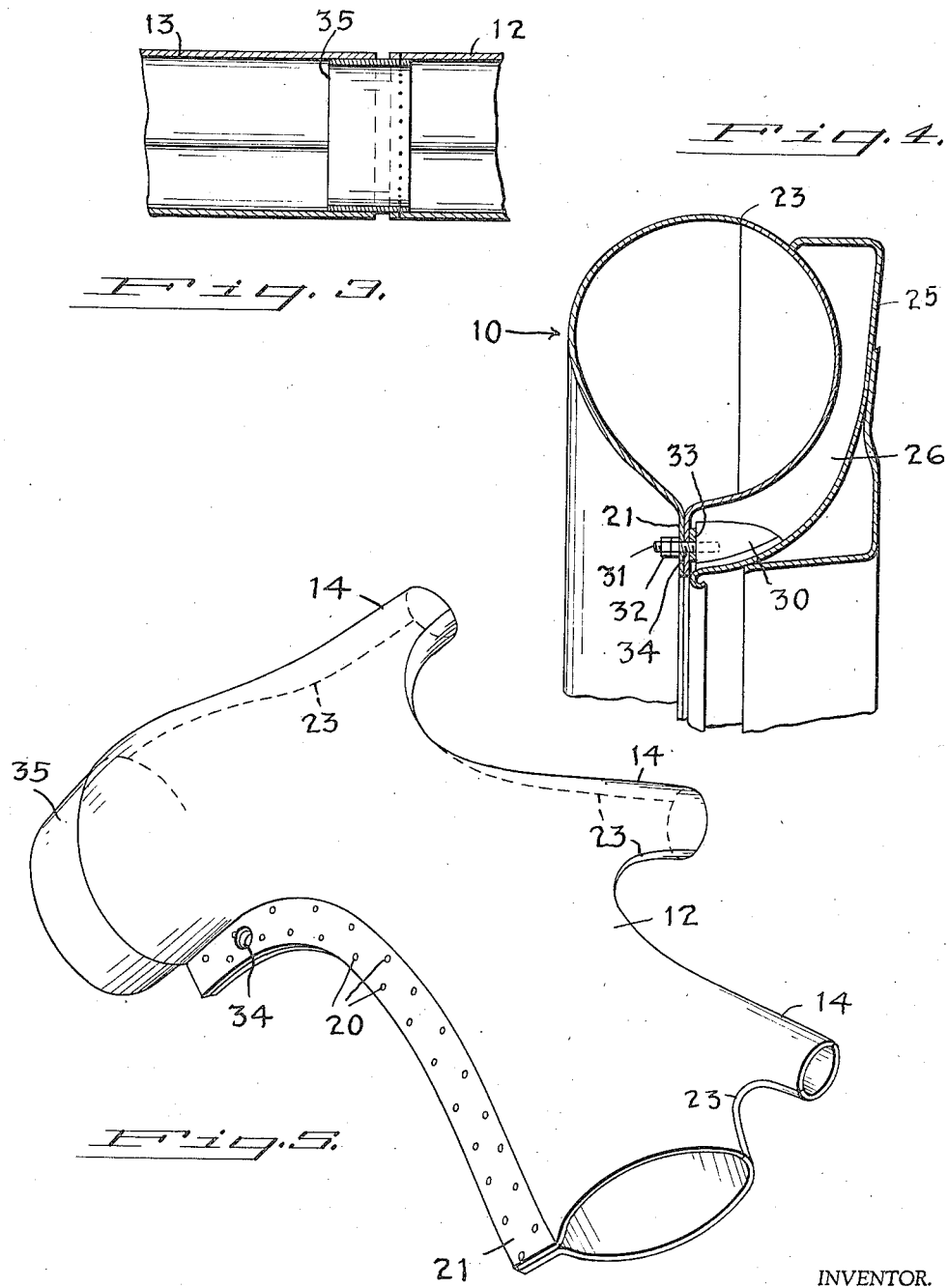

Patented July 1, 1941

2,247,393

UNITED STATES PATENT OFFICE 2,247,393

EXHAUST COLLECTOR

Roscoe I. Markey, East Orange, N. J., assignor to Pollak Manufacturing Company, Arlington, N. J., a corporation of New Jersey Application October 10, 1939, Serial No. 298,769

4 Claims. (Cl. 60—29)

The invention relates to exhaust collectors particularly adapted for use in connection with radial-type aircraft engines.

Exhaust collectors for radial engines generally comprise a hollow annular member having branch pipes leading to the cylinders and an outlet pipe leading from the annular outer member to atmosphere. In practice the hollow annular member is first made. Suitable openings are then cut in the hollow annular member and the branch pipes and outlet pipe are welded into these openings.

The exhaust collector is positioned in close proximity to the engine and as intense heat is developed when the engine is in operation enormous stresses and strains are set up in the parts of the exhaust collector due to expansion and contraction of the metal. As a matter of fact it has been found the circumference of the hollow annular member will increase at least up to ¾ of an inch when the engine is running and the diameter will increase approximately ¼ of an inch. Due to these severe strains often one or more of the branch pipes or the outlet pipe will break off at the weld or in the region of weld where the material may have been weakened by the heat of the welding operation. Naturally this is very troublesome and at times might well be dangerous.

The principal object of the present invention is to provide a construction wherein the probability of the foregoing happening is very remote.

In accordance with the present invention the branch pipes and outlet pipe are made integral with the hollow annular member thus eliminating the weakened spots caused by the numerous welds. In addition the hollow annular member is formed of a plurality of sections and the sections may move slightly in relation to each other thus compensating for the circumferential and diametrical expansion and contraction. Each of the sections is provided with an inwardly extending flange which acts as a sealing ring and supporting ring. The flanges are secured to the cowling and relative movement is permitted in the branch pipes between the hollow annular member and the engine cylinders. Thus no stresses or strains are set up in the branch pipes which would occur were these pipes functioning as supporting members for the hollow annular member.

Other advantages of the invention will become apparent as this specification proceeds. Referring to the drawings forming a part thereof and in which a preferred embodiment of the invention is illustrated:

Fig. 1 is an end elevation, the engine being indicated in broken lines;

Fig. 2 is a sectional view taken on line 2—2 of Fig. 1;

Figs. 3 and 4 are fragmentary detail sectional views taken on lines 3—3 and 4—4 of Fig. 1; and Fig. 5 is a perspective view of one of the sections.

Referring again to said drawings the hollow annular member is designated by the reference numeral 10 and as illustrated comprises three sections 11, 12 and 13. Obviously more sections might be used if desired. The illustrated arrangement lends itself nicely to a nine cylinder radial type engine as two of the sections 11 and 12 each having three branch pipes 14 may be duplicates, thus effecting economies in the cost of dies and manufacturing. The remaining section 13 having the tail pipe or outlet pipe 15 of necessity must be different.

Each of the sections, as particularly shown in Fig. 5, if formed of two pieces suitably welded together, thus giving in effect a hollow annular member in which the branch pipes and the tail pipe are formed integral with their respective sections in contradistiction to the usual method of cutting apertures in the hollow annular member and welding the branch pipes and tail pipe in position. A structure of far greater strength, rigidity and efficiency is thus provided.

It will be noted that each section at what might be termed its inner side is provided with a pair of lips which abut or overlie each other and are secured together by resistance welding 20 to form flanges 21. At approximately the opposite side, as indicated by the broken line 23 in Fig. 5 the other edges of the two parts of each section are welded together. The region of this weld may vary as the joint is provided at the most convenient place to permit drawing of the metal in the two halves of the sections.

The customary cowling 25 is provided and this cowling is secured to the engine in any suitable manner and defines an air chamber 26 between it and the hollow annular member. The air is drawn into this chamber through an upward extension 27, is heated and then passes to the carburetor through a connection not shown as it is no part of the present invention.

The flanges 21 serve a dual purpose. They close the air chamber 26 between the forward edge of the cowling and the hollow annular member and thus act as a sealing ring for the air chamber and in addition they function to support the manifold structure. Secured to the cowling are lugs 30 having forwardly projecting threaded studs 31 which pass through suitable openings in the flanges 21 and nuts 32 on the threaded studs secure the flanges in position. Reinforcing plates 33 may be provided to prevent wear of the openings 34 through which the studs 3 pass as the metal in the manifold system is of thin sheet stock.

The sections are provided with telescopic connections between each other and the construction of these connections may vary. As illustrated a sleeve 35 is welded or otherwise secured in the end of one of the sections. The sleeve 35 extends loosely into the adjoining section and provides the telescopic connection.

The branch pipes 14 are connected at 36 with other pipes 37 leading to the exhaust openings in the cylinders. The connections 36 are not rigid but permit of axial and angular movement of the branch pipes 14 in relation to the pipes 37. Thus an integral efficient construction is provided and one in which practically all strains on the branch pipes are eliminated.

Changes in details of construction and arrangements of parts may be made by one skilled in the art and such changes are to be considered as coming within the spirit of the invention as set forth in the appended claims.

I claim:

1. An exhaust collector having in combination a hollow annular member formed of a plurality of sections, means for forming an air space partly surrounding said hollow annular member, branch pipes and an outlet pipe formed integral with their respective sections, telescopic connections between said sections to permit of the expansion and contraction of said hollow annular member, and flanges on each of said sections, said flanges extending inwardly into the space defined by said hollow annular member and functioning as a sealing ring for said air space surrounding part of said annular member and a supporting ring for carrying said annular member.

2. A device of the character described having in combination, a cowling, a hollow annular member formed of a plurality of sections, branch pipes and an outlet pipe formed integral with their respective sections, telescopic connections between said sections to permit of the expansion and contraction of said hollow annular member, an air space between said cowling and said hollow annular member, flanges extending inwardly into the space defined by said hollow annular member, said flanges acting as a sealing ring for said air space, and means for securing said flanges to said cowling, said flanges thus acting as a supporting means for said hollow annular member and its component parts.

3. A device of the character described having in combination, a cowling, a hollow annular member formed of a plurality of sections, branch pipes and an outlet pipe formed integral with their respective sections, telescopic connections between said sections to permit of the expansion and contraction of said hollow annular member, an air space between said cowling and said hollow annular member, each of said sections being formed of two pieces, lips on the inner edges of each of said pieces, said lips being adapted to overlie each other and be welded together so as to form a flange, said flange extending inwardly into the space defined by said hollow annular member, and adapted to act as a sealing ring for said air space, means for securing said flange to said cowling, said flange thus acting as a supporting means for said hollow annular member and its component parts, and longitudinally extending welds securing the opposite edges of said two pieces together.

4. A device of the character described having in combination, a cowling, a hollow annular member formed of a plurality of sections, branch pipes and an outlet pipe formed integral with their respective sections, telescopic connections between said sections to permit of the expansion and contraction of said hollow annular member, said telescopic connections comprising a sleeve welded or otherwise secured in the end of one of said sections and extending loosely into the end of an adjoining section, an air space between said cowling and said hollow annular member, flanges extending inwardly into the space defined by said hollow annular member, said flanges acting as a sealing ring for said air space, and means for securing said flanges to said cowling, said flanges thus acting as a supporting means for said hollow annular member and its component parts.

ROSCOE I. MARKEY.